United States Patent Office 2,906,420
Patented Sept. 29, 1959

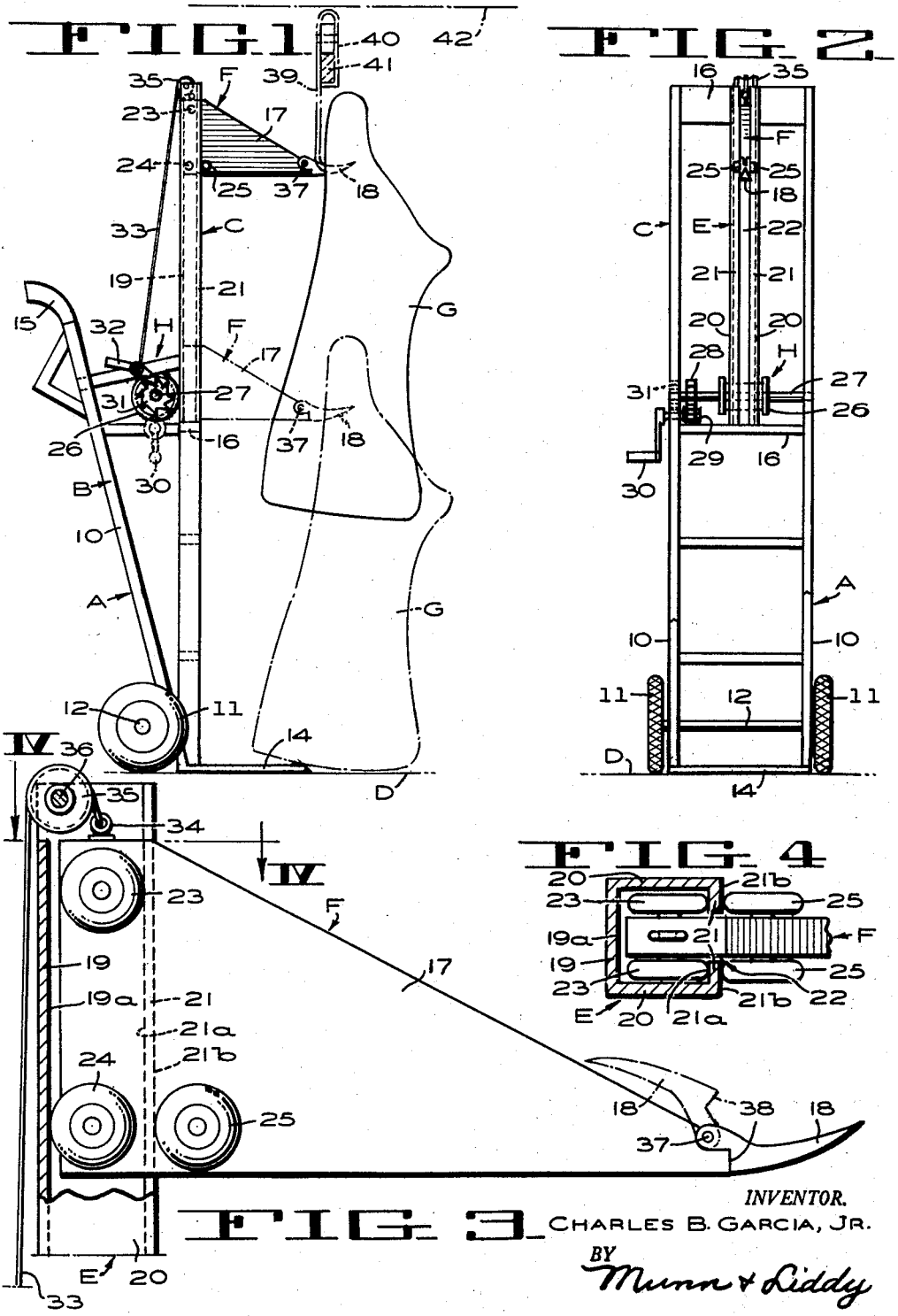

2,906,420

COMBINED TRANSFER TRUCK AND HOIST

Charles B. Garcia, Jr., Oakland, Calif.

Application February 28, 1958, Serial No. 718,263

3 Claims. (Cl. 214—651)

The present invention relates to improvements in a combined transfer truck and hoist. It consists of the combinations, constructions, and arrangement of parts, as hereinafter described and claimed.

It is a well-known fact that meat carcasses, such as quarters and halves, are suspended by hooks on overhead rails, while the carcasses are being transported in vans or in the meat packing or storage plants. These carcasses are difficult to handle by an individual due to the weight of the quarters or halves.

Accordingly, and as the cardinal object of this invention, it is proposed to provide a combined transfer truck and hoist, which is operable for removing the meat carcasses from the hooks on the overhead rails, and lowering the carcasses so that they may be readily transferred from place to place by the truck portion of the apparatus. This will permit the relatively heavy loads to be transferred with facility and ease.

More specifically described, it is proposed to provide a combined transfer truck and hoist, in which the frame of the transfer truck has a hoist frame secured thereto so as to be movable therewith, the hoist frame including an upwardly-extending guide member, which is adapted to be arranged in substantially upright position. Moreover, a carriage is mounted in the guide member for up and down movement therealong, this carriage defining an arm projecting forwardly from the guide member. Also, a hook is mounted on the forward end of the arm and is positioned to penetrate into a suspended meat carcass, when the truck and hoist frames are moved toward the carcass. After a carcass has been engaged by the hook, the carriage may be lowered, thus allowing the meat load to be transferred from place to place by the transfer truck.

Other objects and advantages will appear as the specification proceeds. The novel features will be pointed out in the claims appended hereunto.

Drawings

For a better understanding of the invention, reference should be had to the accompanying drawing, forming part of this specification, in which:

Figure 1 is a side elevational view of my combined transfer truck and hoist, illustrating it as being used for removing a meat carcass from the hook on an overhead rail;

Figure 2 is a front elevational view thereof;

Figure 3 is an enlarged view of the upper part of Figure 1, with portions being shown in section; and Figure 4 is a horizontal sectional view taken along the line IV—IV of Figure 3.

While I have shown only the preferred form of my invention, it should be understood that various changes, or modifications, may be made within the scope of the annexed claims without departing from the spirit thereof.

Detailed description

In carrying my invention into practice, I make use of a transfer truck indicated generally at A, which defines side bars 10 having floor-engaging wheels 11 at the lower ends of these bars. The side bars 10 constitute a truck frame B, which is swingable into various angular positions about the axes of the wheels 11, the latter being mounted on a horizontal axle 12. A hoist frame C is secured to the truck frame B to form a unit movable therewith. It will be noted that the transfer truck A includes a platform 14, which is provided at the lower end of the truck frame B. This platform is adapted to rest on the floor D underneath the hoist frame C to provide a support for the latter, when the hoist frame is disposed in substantially upright position, as shown in Figure 1. Handles 15 are provided on the truck frame B, whereby the transfer truck and the hoist frame C may be moved from place to place.

In its structural details, the hoist frame C includes an upwardly-extending guide member E, which is secured to transverse bars 16 of the hoist frame. A carriage indicated generally at F is mounted in the guide member E for up and down movement therealong. This carriage is held against swinging laterally relative to the guide member E in the manner hereinafter set forth. It will be noted that the carriage F defines an arm 17 projecting forwardly from the guide member E. This arm has a hook 18 mounted on the forward end thereof, the hook being positioned to penetrate into a suspended meat carcass G, when the truck and hoist frames are moved toward the carcass. There is provided a winch H, which is operable to raise and lower the carriage F and its hook 18.

Referring now to the details of the guide member E and the carriage F, as shown in Figures 3 and 4, it will be observed that the guide member defines a rear web 19 having a pair of spaced-apart side flanges 20 projecting from the web. Each of the side flanges is provided with an inwardly-extending front flange 21. The front flanges 21 project toward one another, and define a vertical slot 22 therebetween, the carriage F extending through this slot. The guide member E is hollow, as clearly shown in Figure 4.

For the purpose of supporting the carriage F for up and down movement on the guide member E, I provide a pair of upper rollers 23, which are rotatably secured to the carriage, and are disposed to ride along the interior surfaces 21a of the front flanges 21 of the guide member. Moreover, a pair of lower rollers 24 are rotatably secured to the carriage F, and are disposed to ride along the interior surface 19a of the rear web 19 of the guide member. An additional pair of lower rollers 25 may be provided, if desired, with the rollers 25 being rotatably secured to the carriage, and being disposed to ride along the exterior surfaces 21b of the front flanges 21 of the guide member to thereby assist in steadying the load of the meat carcass G supported by the hook 18.

The winch H may be made of any suitable construction, and for this purpose I have disclosed a drum 26 which is fixed to a horizontal shaft 27. The latter may have a gear 28 fixed thereto (see Figure 2), which meshes with a pinion 29 carried by a crank 30. Also, a ratchet 31 may be fixed to the shaft 27, with a pawl 32 removably engaging with the ratchet. A cable or line 33 may have one end portion thereof wrapped around the drum 26, while its opposite end is anchored to an eye bolt 34, which is fixed to the top of the carriage F (see Figure 3). The intermediate portion of this cable or line passes over a pulley 35, which is rotatably supported on a horizontal stub shaft 36 carried by the top part of the guide member E (see Figure 3).

With particular reference to Figure 3, it will be observed that the hook 18 is swingably secured to the arm 17 by a horizontal journal pin 37. The hook 18 is swingable in an upward direction into an inactive position overlying the arm 17, as disclosed by dot-dash lines in Figure 3. The hook is provided with an abutment 38, which is placed to strike the arm 17 to limit further downward swinging of the hook, when the hook occupies an active position projecting forwardly from the arm, as shown by the full lines in Figure 3.

By way of illustration, I have shown a hook 39 in Figure 1, which is carried by a trolley 40 that rides along a rail 41. This trolley and rail may be carried near the ceiling 42 of a truck van by means of which the carcass G may be supported during the transporting of the carcass. Likewise, the trolley and rail could be part of a meat packing or storage plant, since meat carcasses are often supported in such a manner in these plants.

Assuming that a meat carcass G is supported by the hook 39 and that the operator desires to remove this rather heavy carcass, the transfer truck A may be moved toward the suspended carcass G. The winch H may be actuated to raise or lower the carriage F to the proper elevation so that the hook 18 may be inserted into the carcass G alongside of the hook 39. The truck and hoist frames B and C, respectively, may be moved as a unit toward the carcass so as to advance the hook 18 into the carcass. At this time, the truck and hoisting frames may be swung about the axle 12 until the platform 14 rests on the floor D so as to support the hoist frame C in substantially upright position. In order to remove the hook 39 from the carcass, the winch H may be actuated to raise the carriage F slightly, and then the truck A may be moved so as to withdraw the carcass from the hook 39.

At this time, the carcass G will be supported on the hook 18. The pawl 32 may be disengaged from the ratchet 31, and then the winch H may be actuated so as to lower the carriage F and the carcass G, as suggested by the dot-dash lines in Figure 1. The pawl may be reengaged with the ratchet to hold the carriage F at the desired elevation. The operator may swing the truck frame B and the hoist frame C about the axes of the wheels 11 until the load is balanced above the wheels 11. The entire combined transfer truck and hoist may be readily rolled from place to place.

The rollers 23, 24 and 25 will prevent the carriage F from swinging laterally relative to the guide member C, when the hook 18 is being inserted into the suspended carcass G; and, also, will preclude the shifting of the meat load laterally as the transfer truck A is being rolled about with its load. As suggested by the dot-dash lines in Figure 1, the carriage F may be lowered until the carcass G rests on the platform 14. This will prevent the carcass from swaying as the combined truck and hoist are moved about.

I claim:

1. In a combined transfer truck and hoist: an upwardly-extending guide member; the guide member being hollow, and defining a rear web having a pair of spaced-apart side flanges projecting forwardly from the web; each of these side flanges being provided with an inwardly-extending front flange; the front flanges projecting toward one another, but defining a vertical slot therebetween; a carriage mounted in the guide member for up and down movement therealong; the carriage extending through the slot; a pair of upper rollers rotatably secured to the carriage, and being disposed to ride along the interior surfaces of the front flanges of the guide member; a pair of lower rollers rotatably secured to the carriage, and being disposed to ride along the interior surface of the rear web of the guide member; the carriage defining an arm projecting forwardly from the guide member; a hook mounted on the forward end of the arm and being positioned to penetrate into a suspended meat carcass, when the guide member and the carriage are moved toward the carcass; and means operable to raise and lower the carriage and its arm and hook.

2. In a combined transfer truck and hoist, as defined in claim 1; and in which an additional pair of lower rollers are rotatably secured to the carriage, and being disposed to ride along the exterior surfaces of the front flanges of the guide member to thereby assist in steadying the load of the meat carcass supported by the hook.

3. In a combined transfer truck and hoist: an upwardly-extending guide member; the guide member being hollow and defining a rear web; the front of the guide member having a vertical slot formed therein, with at least one front flange extending along the length of the slot; a carriage mounted in the guide member for up and down movement therealong; the carriage extending through the slot; at least one upper roller rotatably secured to the carriage, and being disposed to ride along the interior surface of the front flange of the guide member; at least one lower roller rotatably secured to the carriage, and being disposed to ride along the interior surface of the rear web of the guide member; the carriage defining an arm projecting forwardly from the guide member; a hook mounted on the forward end of the arm and being positioned to penetrate into a suspended meat carcass, when the guide member and the carriage are moved toward the carcass; means operable to raise and lower the carriage and its arm and hook; and at least one additional lower roller rotatably secured to the carriage, and being disposed to ride along the exterior surface of the front flange of the guide member to thereby assist in steadying the load of the meat carcass supported by the hook.

References Cited in the file of this patent

UNITED STATES PATENTS

| | | |
|---|---|---|
| 2,743,833 | Peterson | May 1, 1956 |
| 2,780,375 | Marcusson | Feb. 5, 1957 |